Figure 1:
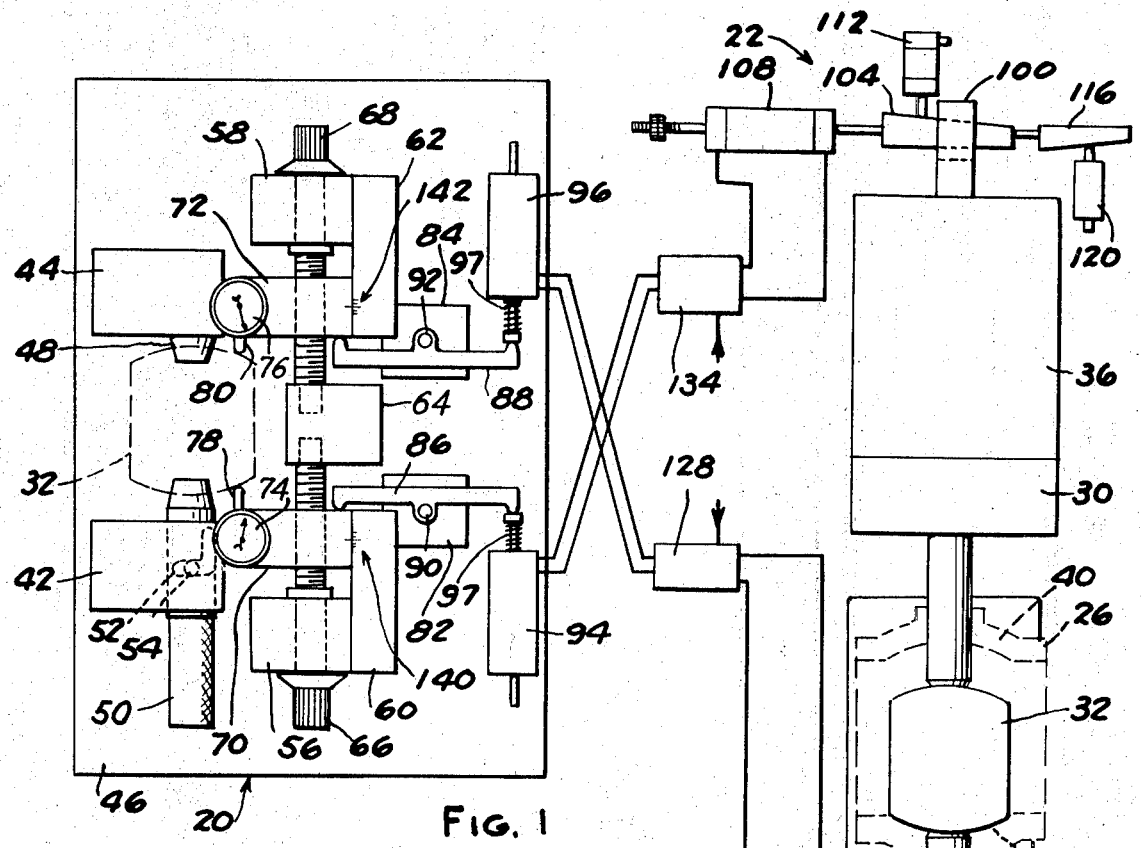

United States Patent

[11] 3,563,133

[72] Inventors Roger C. Asman;
Graham Lloyd, Detroit, Mich.
[21] Appl. No. 748,497
[22] Filed July 29, 1968
[45] Patented Feb. 16, 1971
[73] Assignee Snyder Corporation
Detroit, Mich.
a corporation of Michigan

[54] TOOL COMPENSATOR FOR A PRODUCTION MACHINE
14 Claims, 2 Drawing Figs.
[52] U.S. Cl. .................................................... 90/11;
90/14; 51/165; 33/185
[51] Int. Cl. .................................................... B23c 3/00,
B27g 23/00
[50] Field of Search ....................................... 90/15, 11,
14; 33/185, 174-L, 172-E; 82/14.4; 51/165.14,
165.15; 77/(Inquired); 318/(Inquired)

[56] References Cited
UNITED STATES PATENTS
2,812,623 12/1957 Messerschmidt ............ 51/165-14

Primary Examiner—Gil Weidenfeld
Attorney—Barnes, Kisselle, Raisch & Choate

ABSTRACT: A production machine apparatus which compensates for variations in tools having a remote measuring unit and a control unit. The measuring unit is an adjustable arbor for supporting a cutting tool and a gauge determining the position of a cutting edge of the tool and translating this position into a signal which activates and controls a hydraulic cylinder which positions a movable stop. The stop limits the depth of cut of the tool when it is in a power head which advances the cutting tool into a workpiece.

PATENTED FEB 16 1971 3,563,133

INVENTORS
RODGER C. ASMAN & GRAHAM LLOYD
BY
Barnes, Kisselle, Raisch & Choate
ATTORNEYS

TOOL COMPENSATOR FOR A PRODUCTION MACHINE

This invention relates to tool compensating devices and more particularly to a compensating device with a remote measuring and control unit.

Many machined parts which are produced in large numbers have very small tolerances on some of their machined surfaces. Hence it is necessary to provide production machines which compensate or correct for even slight variations in the cutting tools used in the production machine so that it will produce machined parts which are within the prescribed tolerances. Variations in cutting tools can be due to both the original fabricating of the cutting tools and to the subsequent sharpening of the original tools.

A principal object of this invention is to provide a device for a production machine which determines and compensates for variations in individual cutting tools.

Other objects and features of this invention will be apparent from the following description which discloses the manner and process of making, using and carrying out this invention in the best mode contemplated by the inventor.

In brief, this invention is a remote unit which measures the variation between a cutting tool and a master tool and controls a slave unit which adjusts the position of the cutting tool in a machine relative to the surface to be machined to compensate for the variation from the master which was measured by the remote unit. The remote unit has an adjustable arbor for supporting the cutting tool and adjustable gauging arms which determine the position of the cutting surfaces of the tool relative to the position of the cutting surfaces on a master tool. The slave unit is a wedge which controls the position of the cutting tool in the machine and is controlled by a hydraulic cylinder. Linear variable differential transformers translate both the movement of the wedge on the slave unit and the movement of the gauging arms on the remote unit into electrical signals which through an amplifier and detector circuit activate and control a servovalve which positions the hydraulic cylinder and hence the wedge. After the wedge has been moved to compensate for the variation in a tool cutter, it is locked in place by the activation of a second hydraulic cylinder.

Figure 2:
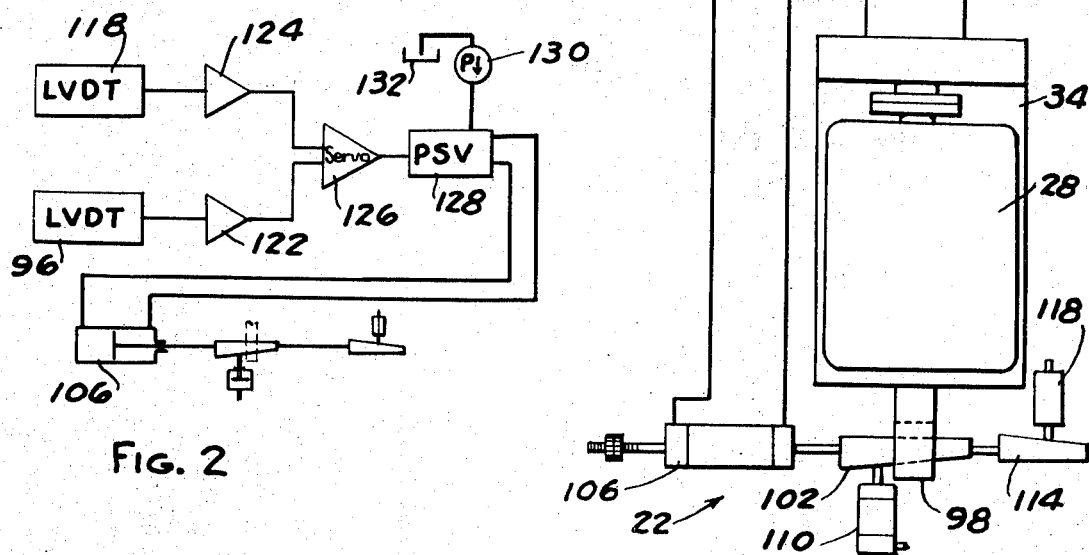

Drawings accompany this disclosure and the various views thereof may be described as:

FIG. 1, a plan view of the remote and slave units connected to a production machine; and FIG. 2, a diagram of the electrical and hydraulic circuits of the tool compensator.

REFERRING TO THE DRAWINGS

In FIG. 1, there is shown a remote measuring unit 20 and slave units 22 in one station 24 of a production machine for milling two opposed convex surfaces in a differential carrier housing 26. A power head 28 and a support head 30 position and drive a milling cutter 32 in workstation 26. Power head 28 and support head 30 are mounted on bases 34, 36 for reciprocal movement so that cutter 32 machines first one and then the other of convex surfaces 38, 40 in carrier housing 26. In carrier housing 26 the distance or space between convex surfaces 38, 40 must be held within close tolerances to produce acceptable carrier housings.

In remote unit 20 arbor supports 42, 44 are rigidly attached to a base plate 46. Arbor stubs 48, 50 are connected to arbor supports 42, 44 and these position milling cutter 32 on base plate 46. Arbor stub 48 is rigidly connected to arbor support 44 and arbor stub 50 is slidably connected to arbor support 42 so that milling cutter 32 can be readily inserted and removed from the arbor stubs. A generally L-shaped groove 52 in arbor support 42 and a pin 54 in movable arbor stub 50 retain arbor stub 50 in arbor support 42 and guide the movement of stub 50 when it engages milling cutter 32. Gauge support blocks 56, 58 are rigidly attached to base plate 46 and support gauge arm guide tracks 60, 62 which are rigidly attached thereto. A support block 64 is rigidly attached to base plate 46 and in cooperation with gauge supports 56, 58 provides a journal and support for threaded shafts 66, 68. Gauge arms 70, 72 are supported in gauge arm tracks 60, 62 and engage with threaded shafts 66, 68. Dial indicators 74, 76 are rigidly mounted on gauge arms 70, 72 and are positioned so that their fingers 78, 80 will contact the outer edge of the cutting surfaces of milling cutter 32 when gauge arms 70, 72 are moved toward each other by manually turning threaded shafts 66, 68. Lever support blocks 82, 84 are rigidly attached to base plate 46 and position lever arms 86, 88 which are pivotally mounted on the support blocks by pins 90, 92 for engagement with gauge arms 70, 72. Linear variable differential transformers (LVDT) 94, 96 are rigidly mounted on base plate 46 and translate the movement of levers 86, 88 into an electrical signal which is proportional to the displacement of the levers. Springs 97 urge both the cores of LVDT's 94, 96 into engagement with levers 86, 88 and the levers into engagement with gauge arms 70, 72. Since levers 86, 88 are displaced by the movement of gauge arms 70, 72, the electrical signal of LVDT's 94, 96 represents the position of gauge arms 70, 72.

The extent to which power head 28 moves toward surface 40 of carrier housing 26 determines the amount of material that will be machined from surface 40 and the extent to which support head 30 on base 36 moves toward surface 38 determines the amount of material that will be removed from surface 38 of carrier housing 26. Stop arms 98, 100 rigidly connected to power head 28 and support head 30 and position stop wedges 102, 104 attached to the base of workstation 24 limit and control the travel of power head 28 toward surface 40 and support head 30 toward surface 38 of carrier housing 26. Hydraulic cylinders 106, 108 attached to the base unit of workstation 24 reciprocate stop wedges 102, 104 in a direction substantially perpendicular to the reciprocal movement of power and support heads 28, 30. When activated, hydraulic cylinders 110, 112 engage position stop wedges 102, 104 and prevent them from being moved by hydraulic cylinders 106, 108. Sensing wedges 114, 116 are rigidly connected to position stop wedges 102, 104 and slidably engage with the core of slave LVDT's 118, 120, the bases of which are rigidly connected to the base of workstation 24. LVDT's 118, 120 translate the movement of wedges 114, 116 into electrical signals which are proportional to the displacement of stop wedges 102, 104. Hence the electrical signal from LVDT's 118, 120 varies with and is proportional to the stopping position of power and support heads 28, 30 when they are machining surfaces 38, 40 in carrier housing 26.

In FIG. 2, the electrical signal from gauge LVDT 96 and from slave LVDT 118 is amplified by amplifiers 122, 124 and fed into a differential detector 126 which activates and controls a hydraulic proportional servovalve 128. A hydraulic pump 130 supplies hydraulic fluid under pressure from a reservoir 132 to servovalve 128 which directs the hydraulic fluid to cylinder 106 in accordance with the commands of differential detector 126. Differential detector 126 compares the electrical signal of gauge LVDT 96, which indicates the position of gauge arm 80, with the electrical signal from LVDT 118, which indicates the position of stop wedge 102. If there is a difference between the sign or absolute numerical value of the two signals, differential detector 126 commands proportional servovalve 128 to move hydraulic cylinder 106 until the electrical signals are nulled or have the same sign and the same numerical value. A second similar circuit (not shown) amplifies the electrical signals of gauge LVDT 94 and slave LVDT 120 and drives a second differential detector which actuates and controls proportional servovalve 134. Servovalve 134 directs hydraulic fluid from pump 130 in accordance to the commands of the second differential detector so that wedge 104 is positioned so that the electrical signal from slave LVDT 120 is nulled with the electrical signal from gauge LVDT 94. In short, the electrical signal from gauge LVDT 96 controls the stopping position of power head 28 and hence the end point of the machining of surface 40 of carrier housing 26 and gauge LVDT 94 controls the stopping position of support head 30 and hence the end point of the machining of surface 38 of carrier housing 26.

After stop wedges 102, 104 have been positioned by the remote unit 20, they are locked in place by the activation of hydraulic cylinders 110, 112. The circuitry for activating hydraulic cylinders 110, 112 is not shown. Because hydraulic cylinders 106, 108 have a tendency to creep or move slightly over extended periods of time, it is necessary to lock stop wedges 102, 104 in the desired position.

In operating this device, master, or as nearly identical as possible, milling cutters 32 are inserted in both the workstation 24 and the remote unit 20 and the remote unit is adjusted so that dial gauges 70, 72 and markers 140, 142 on gauge arms 70, 72 are both on zero when the master cutter in workstation 24 produces the desired dimension or tolerance between machined surfaces 38, 40 in workpiece 26. After this initial adjustment of "zeroing in" of the device, each milling cutter to be used in workstation 24 is first placed in remote unit 20 and gauge arms 70, 72 are positioned by adjusting threaded shafts 66, 68 so that fingers 78, 80 are in contact with the edges of the cutting surfaces and dial indicators 70, 72 each have a zero reading. Hydraulic cylinders 110, 112 are then deactivated so that the electrical signals from gauge LVDT's 94, 96 can cause the differential detectors to position wedges 102, 104 so that the electrical signals from slave LVDT's 118, 120 are nulled with the electrical signals from gauge LVDT's 96, 94. The movement of wedges 102, 104 compensates for the variation between the master tool cutter and the tool cutter which is in the remote unit. After wedges 102, 104 have moved to compensate for the variation in the cutters, hydraulic cylinders 110, 112 are reactivated to lock wedges 102, 104 in place. The replacement tool cutter is then removed from the remote unit and inserted in workstation 24. Since the stop wedges 102, 104 have been moved to compensate for the discrepancy between the master cutter and the replacement cutter, workstation 24 will continue to produce workpieces with machined surfaces 38, 40 within the specified tolerances.

With this apparatus, each time a cutting tool is reground for sharpening, it may be placed in the remote unit 20 to readjust the wedges 102, 104 and then the reground tool may be again inserted at the cutting station and used for cutting work parts. Thus the accuracy of the parts may be maintained and the tool may have a long life without the necessity of frequent replacement.

We claim:

1. A tool compensator for a production machine of the type having at least one movable tool driving head for a tool cutter, which includes:
   a. a base;
   b. support means connected to said base for releasably receiving, positioning and supporting a cutter tool;
   c. at least one gauge means connected to said base and positioned with respect to said support means for determining the position of a cutting edge of a cutting tool in said support means;
   d. gauge sensing means associated with each of said gauge means for indicating the displacement of said gauge means relative to a predetermined position of said gauge means;
   e. adjustable stop means associated with at least one movable tool drive head of a production machine for controlling and limiting the depth of cut of a tool cutter connected to said drive head;
   f. at least one actuating means for adjusting said stop means;
   g. stop sensing means associated with each of said adjustable stop means for indicating the limit of the depth of cut provided by said stop means; and
   h. control means using the indication from at least one of said gauge sensing means and the indication from at least one of said stop sensing means for controlling at least one of said actuating means to limit the depth of cut of a tool cutter on one of said tool drive heads in accordance with the position of a cutting edge as determined by one of said gauge means.

2. A tool compensator for a production machine as defined in claim 1 in which said gauge means includes:
   a. track means fixedly connected to said base providing a guideway for a gauge arm;
   b. a gauge arm slidably engaging said track means; and
   c. threaded drive means engaging said arm to traverse said arm on said track means.

3. A tool compensator for a production machine as defined in claim 1 in which said actuating means includes at least one piston in a cylinder displaceable by a fluid pressure.

4. A tool compensator for a production machine as defined in claim 2 in which said actuating means includes at least one piston in a cylinder displaceable by a fluid pressure.

5. A tool compensator for a production machine as defined in claim 1 in which said stop means includes at least one wedge means connected to said actuating means.

6. A tool compensator for a production machine as defined in claim 4 in which said stop means includes at least one wedge means connected to said piston.

7. A tool compensator for a production machine as defined in claim 1 in which said gauge sensing means and said stop sensing means each includes means for translating said indications into electrical signals proportional to and varying with said indications.

8. A tool compensator for a production machine as defined in claim 4 in which said gauge sensing means and said stop sensing means each includes means for translating said indications into electrical signals proportional to and varying with said indications.

9. A tool compensator for a production machine as defined in claim 1 in which said gauge sensing means and said stop sensing means each includes at least one linear variable differential transformer.

10. A tool compensator for a production machine as defined in claim 4 in which said gauge sensing means and said stop sensing means each includes at least one linear variable differential transformer.

11. A tool compensator for a production machine as defined in claim 1 in which said control means includes at least one differential detector and at least one proportional servovalve connected to and controlling at least one of said actuating means.

12. A tool compensator for a production machine as defined in claim 8 in which said control means includes at least one proportional servovalve connected to at least one of said cylinders and at least one differential detector connected to both at least one of said gauge translating means and to at least one of said stop translating means.

13. A tool compensator for a production machine as defined in claim 9 in which said control means includes at least one proportional servovalve connected to and controlling at least one of said actuating means and at least one differential detector connected to both a gauge and a stop linear variable differential transformer.

14. A tool compensator for a production machine as defined in claim 1 in which said control means includes at least one differential detector connected to both one of said translating means of said gauge sensing means and one of said translating means of said stop sensing means and at least one proportional servovalve connected to and controlling one of said actuating means.

PO-1050
(5/69)

UNITED STATES PATENT OFFICE
CERTIFICATE OF CORRECTION

Patent No. 3,563,133      Dated February 16, 1971

Inventor(s) Roger C. Asman, and Graham Lloyd

It is certified that error appears in the above-identified patent and that said Letters Patent are hereby corrected as shown below:

Column 4, Line 61, change "claim 1" to --claim 7--.

Signed and sealed this 21st day of March 1972.

(SEAL)
Attest:

EDWARD M. FLETCHER, JR.　　　　　　　　　ROBERT GOTTSCHALK
Attesting Officer　　　　　　　　　　　　Commissioner of Paten